United States Patent
Ito

(10) Patent No.: US 12,375,015 B2
(45) Date of Patent: Jul. 29, 2025

(54) DRIVE SYSTEM AND CONTROL METHOD

(71) Applicant: TOSHIBA MITSUBISHI-ELECTRIC INDUSTRIAL SYSTEMS CORPORATION, Chuo-ku (JP)

(72) Inventor: Takumi Ito, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/262,689

(22) PCT Filed: Dec. 17, 2021

(86) PCT No.: PCT/JP2021/046735
§ 371 (c)(1),
(2) Date: Jul. 24, 2023

(87) PCT Pub. No.: WO2023/112304
PCT Pub. Date: Jun. 22, 2023

(65) Prior Publication Data
US 2024/0322718 A1 Sep. 26, 2024

(51) Int. Cl.
*H02P 21/24* (2016.01)
*H02P 6/06* (2006.01)
*H02P 6/16* (2016.01)
*H02P 6/20* (2016.01)

(52) U.S. Cl.
CPC .......... *H02P 6/20* (2013.01); *H02P 6/06* (2013.01); *H02P 6/16* (2013.01)

(58) Field of Classification Search
CPC ...... H02P 6/20; H02P 6/06; H02P 6/16; H02P 21/24; H02P 6/183
See application file for complete search history.

(56) References Cited

U.S. PATENT DOCUMENTS

| 2010/0045218 A1* | 2/2010 | Tomigashi | H02P 6/183 |
| | | | 318/400.33 |
| 2010/0286948 A1* | 11/2010 | Terada | H02P 21/24 |
| | | | 702/150 |

FOREIGN PATENT DOCUMENTS

| JP | 2007-037274 A | | 2/2007 |
| JP | 2011-109870 A | | 6/2011 |
| JP | 2020120513 A | * | 8/2020 |

OTHER PUBLICATIONS

International Search Report mailed on Mar. 1, 2022 in PCT/JP2021/046735 filed on Dec. 17, 2021 (4 pages).

* cited by examiner

*Primary Examiner* — Cortez M Cook
(74) *Attorney, Agent, or Firm* — Oblon, McClelland, Maier & Neustadt, L.L.P.

(57) ABSTRACT

A drive system according to an aspect of an embodiment includes a rotor phase detection unit, a phase estimation unit, a phase error adjustment unit, and a drive control unit. The rotor phase detection unit detects a phase of a rotor of a synchronous motor and outputs phase information indicating the detected phase. The phase estimation unit generates an initial phase command of defining a position of the rotor of the synchronous motor by using a correction amount for correcting a phase error. The phase error adjustment unit generates the correction amount for adjusting a phase error of an initial magnetic pole position of the synchronous motor by using a phase error of the initial phase command at a timing defined by the phase information. The drive control unit controls the driving of the synchronous motor by using the initial phase command obtained by adjusting the phase error.

4 Claims, 7 Drawing Sheets

| No | PID | $\theta$P | | PCID | $\theta$PC |
|---|---|---|---|---|---|
| 1 | P1 | $\theta$PC1 | ±α | PC1 | $\theta$PC1 |
| 2 | P2 | $\theta$PC2 | ±α | PC2 | $\theta$PC2 |
| 3 | P3 | $\theta$PC3 | ±α | PC3 | $\theta$PC3 |
| 4 | P4 | $\theta$PC4 | ±α | PC4 | $\theta$PC4 |
| 5 | P5 | $\theta$PC5 | ±α | PC5 | $\theta$PC5 |
| 6 | P6 | $\theta$PC6 | ±α | PC6 | $\theta$PC6 |

DRIVE SYSTEM AND CONTROL METHOD

TECHNICAL FIELD

Embodiments of the present invention relate to a drive system and a control method.

BACKGROUND ART

In a drive system capable of controlling a speed of an excitation type synchronous motor (hereinafter, simply referred to as a synchronous motor), a phase control after startup is performed by using an initial magnetic pole position at startup. When the value of the initial magnetic pole position used for this control includes an error that exceeds a predetermined amount, the motor may not start.

CITATION LIST

Patent Document

[Patent Document 1]
Japanese Unexamined Patent Application No. 2011-109870

SUMMARY OF INVENTION

Technical Problem

The problem to be solved by the present invention is to provide a drive system and a control method capable of more accurately assigning a phase at a startup stage of a synchronous motor.

Solution to Problem

A drive system according to an aspect of an embodiment includes a rotor phase detection unit, a phase estimation unit, a phase error adjustment unit, and a drive control unit. The rotor phase detection unit detects a phase of a rotor of a synchronous motor and outputs phase information indicating the detected phase. The phase estimation unit generates an initial phase command of defining a position of the rotor of the synchronous motor by using a correction amount for correcting a phase error. The phase error adjustment unit generates the correction amount for adjusting a phase error of an initial magnetic pole position of the synchronous motor by using a phase error of the initial phase command at a timing defined by the phase information. The drive control unit controls the driving of the synchronous motor by using the initial phase command obtained by adjusting the phase error.

DESCRIPTION OF EMBODIMENTS

Figure 1A:
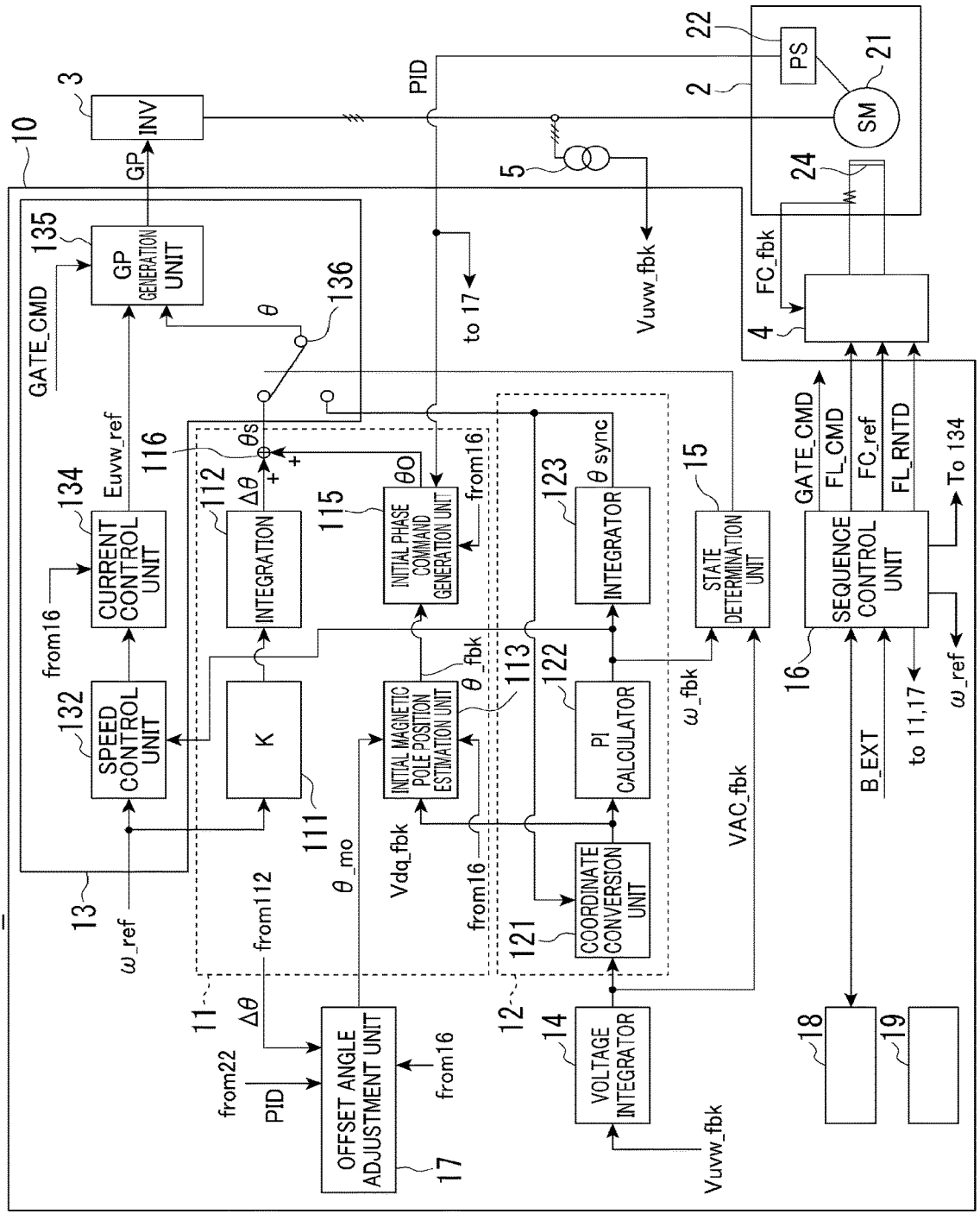
FIG. 1A is a configuration diagram of a drive system of an embodiment.

Hereinafter, a drive system and a control method of an embodiment will be described with reference to the drawings. In the following description, the same reference numerals will be given to the components having the same or similar functions and the overlapping descriptions of those components may be omitted. Additionally, the electrical connection may be simply referred to as "connected".

Figure 1B:
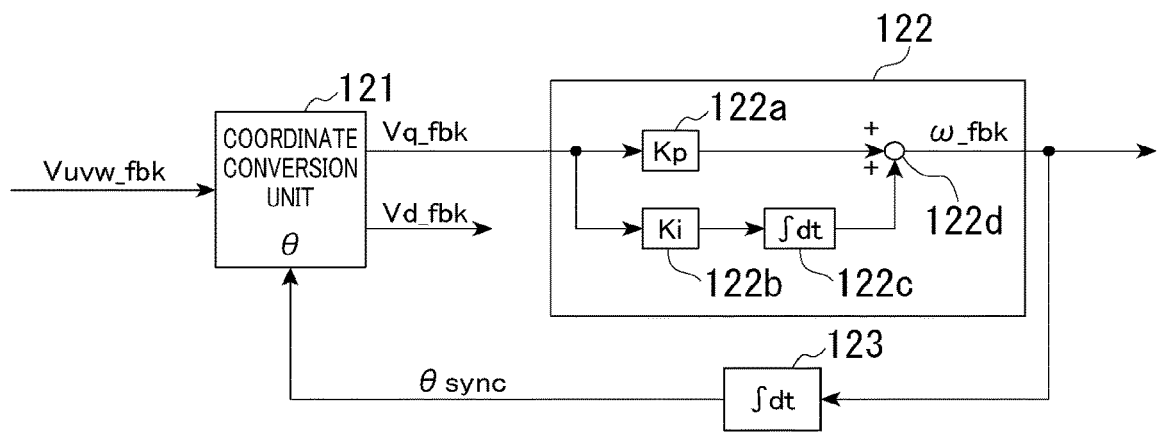
FIG. 1B is a configuration diagram of a second phase estimation unit of the embodiment.

FIG. 1A is a configuration diagram of a drive system 1 of the embodiment. FIG. 1B is a configuration diagram of a second phase estimation unit 12 inside a control unit 10 of the embodiment.

The drive system 1 includes, for example, a synchronous motor 2, an inverter 3, an exciter 4, an instrument transformer 5, and a control unit 10.

Figure 2:
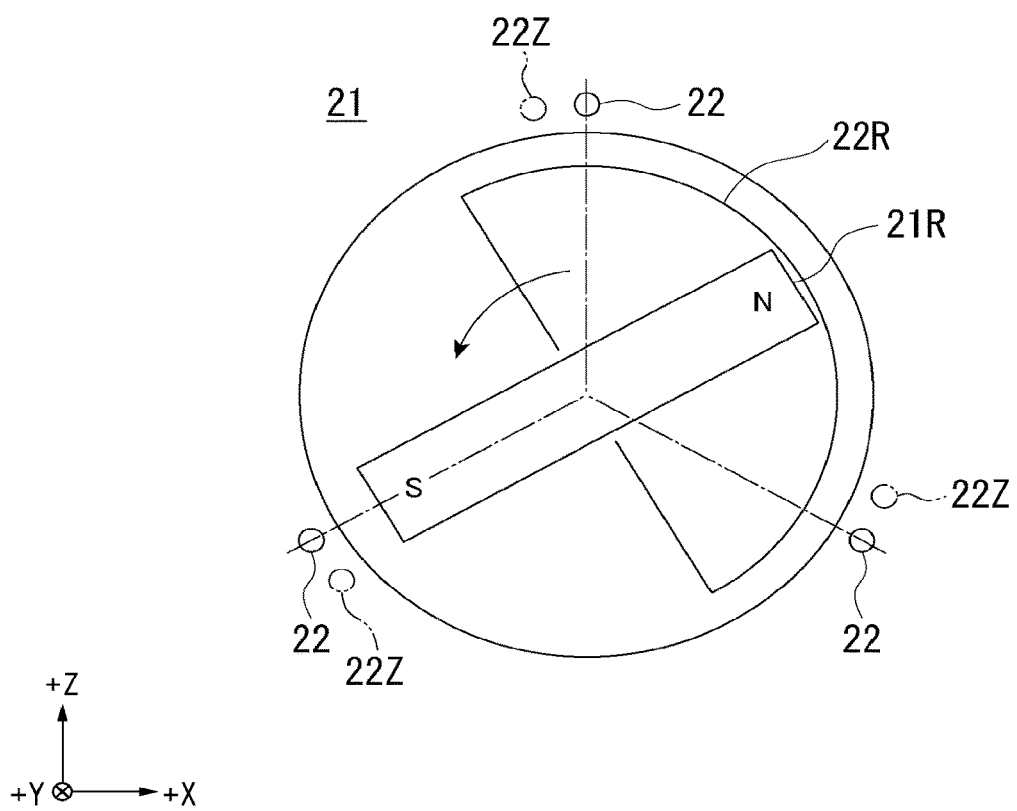
FIG. 2 is a schematic view showing the arrangement of a position detector of the embodiment.

The synchronous motor 2 includes a main body 21 and a position detector 22 (FIG. 2, the rotor phase detection unit).

The synchronous motor 2 is, for example, an excitation type synchronous motor provided with a field winding 24.

A rotor 21R (FIG. 2), a stator winding (not shown), and a field winding 24 are provided inside the main body 21 of the synchronous motor 2. The synchronous motor 2 is driven by, for example, three-phase AC power of U, V, and W phases. The detailed description of the main body 21 of the synchronous motor 2 will be omitted, but an excitation type synchronous motor having a general structure may be adopted.

Figure 3A:
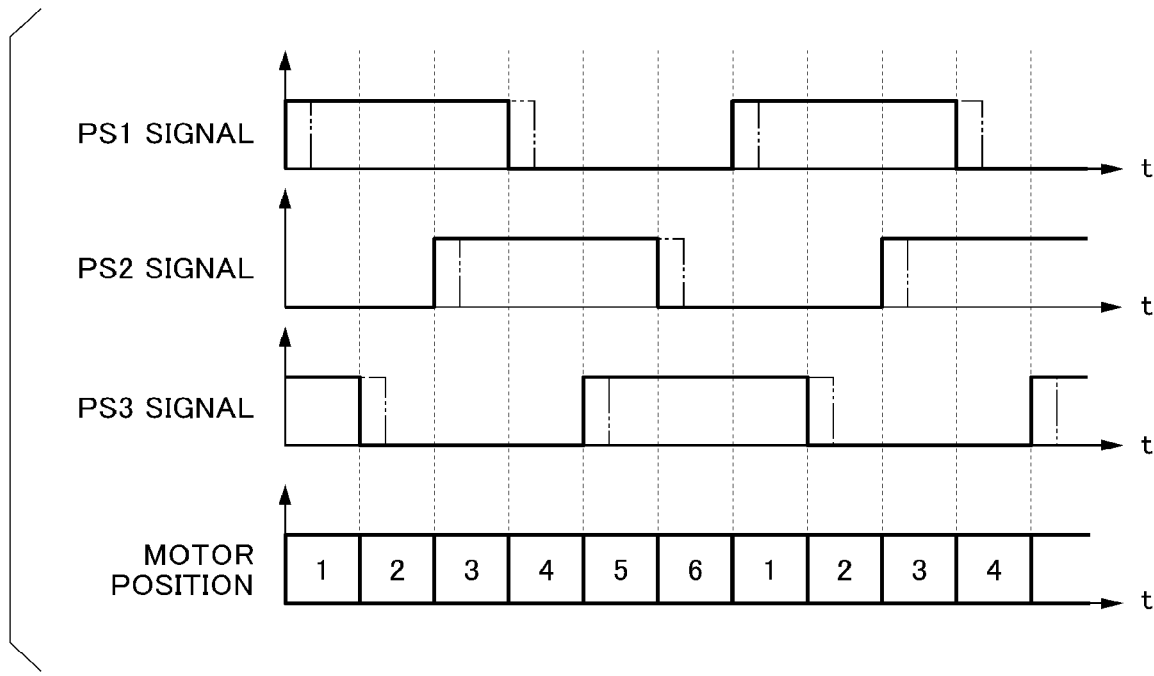
FIG. 3A is a diagram showing a relationship between an output signal of a position detector and a rotor phase used for position control of the embodiment.
Figure 3B:
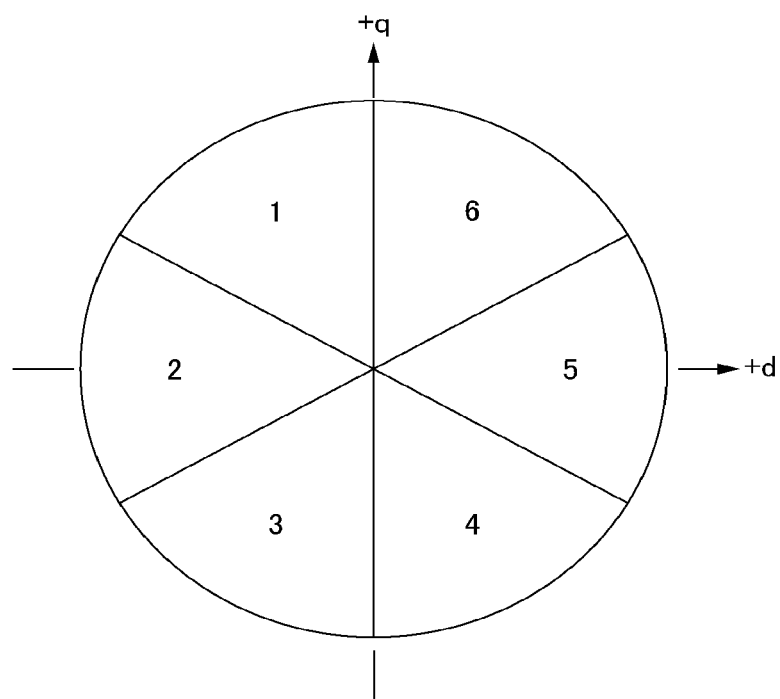
FIG. 3B is a diagram showing a rotor coordinate used for position control of the embodiment.

Referring to FIGS. 2 to 3B, the position detection of the rotor 21R of the embodiment will be described.

FIG. 2 is a schematic diagram showing the arrangement of the position detector 22 of the embodiment. FIG. 3A is a diagram showing a relationship between an output signal of the position detector 22 and a rotor phase used for position control of the embodiment. FIG. 3B is a diagram showing a rotor coordinate used for position control of the embodiment.

The schematic view shown in FIG. 2 shows the position of the position detector 22 when the position detector 22 is viewed from the axial direction.

A rotation body 22R for the position detector 22 rotating together with a shaft is provided in the shaft of the rotor 21R. The position detector 22 detects the position (referred to as the rotor position) of the rotor 21R by detecting the position of the rotation body 22R. Additionally, the detection accuracy of the position detector 22 may have an accuracy that can identify angle regions in which one lap is equally divided into numerical divisions.

For example, the position detector 22 includes a proximal sensor switch (a proximity switch) which is disposed so as to be capable of detecting the phase of the rotor 21R of the synchronous motor 2. The position detector 22 detects the rotor position with a resolution of 60° using a semicircular rotation body 22R and three proximity switches arranged to be shifted by 120° in the circumferential direction of the shaft. For example, the rotor positions are shown by the identification numbers from 1 to 6. The position detector 22 shows the detected rotor position as the position number using the values of 1 to 6 and outputs this position number as position information.

Additionally, when the position of the position detector 22 is not properly adjusted or when the position of the position detector 22 is not adjusted, the position may become the position indicated by reference numeral 22Z. For example, a case in which the position of the position detector 22 is not properly adjusted includes a case in which the position of each position detector 22 is deviated by a predetermined amount from the mechanical position around the shaft of the synchronous motor 2. In such a case, the detected position of the rotation body 22R (the initial magnetic pole position) may be detected with a predetermined deviation from the correct position. In other words, the detected position of the rotation body 22R may include an error exceeding a predetermined amount determined by the model or individual of the synchronous motor 2. Additionally, the above phenomenon is not due to variations in the positions of the position detectors 22, but may occur even in a situation in which the position detectors 22 are spaced from each other by 120° in the circumferential direction of the shaft.

FIG. 3A shows a relationship between a detection result of the position detector 22 and a PS1 signal, a PS2 signal, and a PS3 signal respectively output from three proximity switches of the position detector 22 during rotation as a timing chart.

The PS1 signal, the PS2 signal, and the PS3 signal are two-value signals with a duty ratio of 50%. Depending on the arrangement positions of the proximity switches, the phases of the signals are shifted by 120°. The position detector 22 generates position information identified by, for example, the values of 1 to 6 by converting the combination of the logical values indicated by the PS1 signal, the PS2 signal, and the PS3 signal. In this way, the position detector 22 is formed in a lower resolution compared to the resolution of the position sensor such as a rotary encoder used for general position control. Additionally, the application of the rotary encoder having a relatively high resolution is not limited as the position detector 22. For example, when the signal detected by the relatively high-resolution rotary encoder is converted into a low-resolution signal, the rotary encoder can be treated in the same way as the position detector 22.

FIG. 3B shows the position of the detection result of the position detector 22 by using a rotor coordinate. The rotor coordinate has orthogonal d and q axes. The angle regions of 1 to 6 are divided in a counterclockwise from the direction of the +q axis. The angle regions are equally divided into predetermined angles defined larger in the range of detection accuracy required to start the synchronous motor 2.

Additionally, when the position of the position detector 22 is not properly adjusted as shown in FIG. 2, the phases of the PS1 signal, PS2 signal, and PS3 signal output by the position detector 22 may be detected as the phases being deviated as indicated by the dashed lines in FIG. 3A.

Returning to FIG. 1A, the description of the drive system 1 is continued.

An inverter 3 is a power converter including multiple semiconductor switching elements. The inverter 3 converts DC power into three-phase AC power and supplies the AC power to the synchronous motor 2. The configuration of the inverter 3 is not limited and a general configuration may be adopted.

The exciter 4 supplies desired DC power to the field winding 24 of the synchronous motor 2.

In the instrument transformer 5, a primary winding is connected to an electric line of each phase connecting the inverter 3 and the synchronous motor 2 and a voltage according to the voltage of each phase is output to a secondary winding.

The control unit 10 includes a first phase estimation unit 11, a second phase estimation unit 12, a drive control unit 13, a voltage integrator (state estimation unit) 14, a state determination unit 15, a sequence control unit 16, an offset angle adjustment unit 17, an input-output unit 18, and a storage unit 19.

Additionally, the control unit 10 includes, for example, a processor such as a CPU and may realize some or all of function units such as the first phase estimation unit 11, the second phase estimation unit 12, the drive control unit 13, the voltage integrator 14, the state determination unit 15, the sequence control unit 16, the offset angle adjustment unit 17, and the input-output unit 18 in such a manner that the processor executes a predetermined program stored in the storage unit 19. Alternatively, the above may be realized by the combination of electric circuits (circuitry). The control unit 10 may execute a transfer process of each data using a memory area of the storage unit 19 and a calculation process for analysis by executing a predetermined program using a processor. For example, the control unit 10 may be a so-called computer and may be configured using an FPGA (Field Programmable Gate Array).

For example, the input-output unit 18 may include a display unit that displays a display prompting a user's operation for controlling the control unit 10 and an operation reception unit that receives the user's operation. The input-output unit 18 having such a configuration may include, for example, a touch panel type liquid crystal display unit, and is not limited thereto. The input-output unit 18 may be configured to include a communication unit that communicates with the outside instead of or in addition to the above. The input-output unit 18 may transmit information for displaying a display prompting a user's operation for controlling the control unit 10 to an external device or receive a user's operation notified from the external device. The input-output unit 18 adds the information for the control of the control unit 10 received or acquired as described above to the storage unit 19, and further notifies the information to the sequence control unit 16. The input-output unit 18 receives a notification from the sequence control unit 16, acquires information indicating the control state of the sequence control unit 16, and displays the information on the display unit. For example, the user's operation for controlling the control unit 10 may include an operation for initializing the control unit 10.

The sequence control unit 16 controls the following units at a predetermined timing to execute a desired operation. The sequence control unit 16 receives a user's operation for controlling the control unit 10. For example, when the user's operation for controlling the control unit 10 is an operation for initializing the control unit 10, an initialization process of each part inside the control unit 10 is performed. For example, this initialization process includes the adjustment of the offset angle adjustment unit 17. Details of the control will be described later.

The first phase estimation unit 11 generates a first phase $\theta s$ obtained by estimating the phase of the rotor 21R on the basis of an initial phase in a rotor coordinate system corresponding to an actual rotor position at the startup stage of the synchronous motor 2. The first phase estimation unit 11 corrects the first phase by using the detection result of the rotor position detected from the start of the startup procedure of the synchronous motor 2 to the successful startup.

The second phase estimation unit 12 generates a second phase obtained by estimating the phase of the rotor 21R on the basis of the operation state of the synchronous motor 2. The state determination unit determines the operation state of the synchronous motor 2.

The drive control unit 13 controls the driving of the synchronous motor 2 by using any one of the first phase θs and the second phase according to the determination result of the operation state of the synchronous motor 2.

A voltage vector Vuvw_fbk is calculated on the basis of the detection value obtained by integrating the phase voltages of the synchronous motor 2 and the voltage integrator (state estimation unit) 14 and further a voltage value V_fbk^-abs of an index indicating the amplitude of the phase voltage is calculated.

The state determination unit 15 determines the operation state of the synchronous motor 2. For example, the state determination unit 15 may determine the operation state of the synchronous motor 2 on the basis of the voltage value V_fbk^abs and the speed ω_fbk to be described later.

The offset angle adjustment unit 17 is an example of the phase error adjustment unit. The offset angle adjustment unit 17 generates a correction amount for adjusting the phase error of the initial magnetic pole position with respect to the phase of the rotor 21R. As described above, the phase of the rotor 21R is detected by the position detector 22. The offset angle adjustment unit 17 generates an offset value θ_mo of the phase for adjusting the phase error of the initial magnetic pole position of the rotor 21R with respect to the detection result. The offset angle adjustment unit 17 writes the offset value θ_mo of the initial magnetic pole position which is the adjustment result to the storage unit 19 to be stored therein.

For example, the offset angle adjustment unit 17 adjusts the initial magnetic pole position with respect to the phase of the rotor 21R in accordance with the request of the initialization process from the sequence control unit 16 and thus reduces the phase error of the initial magnetic pole position.

Hereinafter, more detailed configuration examples of the above units will be described.

As shown in FIG. 1B, the second phase estimation unit 12 includes, for example, a coordinate conversion unit 121, a PI calculator 122, and an integrator 123.

The coordinate conversion unit 121 calculates a field voltage feedback Vdq_fbk by using a second phase θsync on the basis of a field voltage feedback Vuvw_fbk generated by the voltage integrator 14. This calculation is, for example, a dq conversion that converts a three-phase signal into two-phase signals of the rotor coordinate system.

The PI calculator 122 performs a proportional integral calculation of which characteristics are defined by a coefficient of a predetermined value on the basis of the value of the q-axis component (voltage Vq_fbk) of the field voltage feedback Vdq_fbk described above.

For example, the PI calculator 122 includes calculation blocks 122a, 122b, 122c, and 122d. The calculation block 122a performs a proportional calculation on the voltage Vq_fbk by using a coefficient Kp. The calculation block 122b a proportional calculation on the voltage Vq_fbk by using a coefficient Ki. Additionally, the coefficient Ki is used as a coefficient for integral calculation. The calculation block 122c performs an integral calculation on the product of the coefficient Ki and the voltage Vq_fbk which is the calculation result of the calculation block 122b. The calculation block 122d adds the proportional calculation result of the calculation block 122a and the integral calculation result of the calculation block 122c.

The integrator 123 integrates the proportional integration calculation result by the PI calculator 122 to generate the second phase θsync.

Accordingly, the second phase estimation unit 12 constitutes PLL by using the coordinate conversion unit 121, the PI calculator 122, and the integrator 123.

As shown in FIG. 1A, the first phase estimation unit 11 includes, for example, a proportional calculation unit 111, an integral calculation unit 112, an initial magnetic pole position estimation unit 113, an initial phase command generation unit 115, and an addition calculation unit 116.

The proportional calculation unit 111 performs a proportional calculation on a speed command ω_ref by using a coefficient K.

The integral calculation unit 112 (integration) integrates the proportional calculation result of the proportional calculation unit 111 to generate a phase Δθ. The phase Δθ corresponds to an angle in which the rotor 21R rotates after startup. The proportional calculation unit 111 and the integral calculation unit 112 are examples of a calculation processing unit which calculates the phase Δθ on the basis of the speed command of the synchronous motor 2.

The initial magnetic pole position estimation unit 113 estimates an initial magnetic pole position θ_fbk on the basis of the field voltage feedback Vdq_fbk. The initial magnetic pole position estimation unit 113 calculates the initial magnetic pole position θ_fbk by using the following formula (1).

$$\theta\_fbk = \tan^{-1}(Vd\_fbk/Vq\_fbk) + \theta\_mo \quad (1)$$

Furthermore, the initial magnetic pole position estimation unit 113 adds the offset value θ_mo of the phase to the initial magnetic pole position θ_fbk as shown in the formula (1). The offset value θ_mo of the phase may be, for example, a value which is set in advance in an adjustment stage of the synchronous motor 2 during installation or the like. More specifically, it is preferable that the offset value θ_mo of the phase is adjusted by the offset angle adjustment unit 17 in accordance with the detection result of the position detector 22.

The initial phase command generation unit 115 acquires, for example, the detection phase corresponding to the phase of the rotor detected by the position detector 22 and the calculation result of the initial magnetic pole position estimation unit 113. The initial phase command generation unit 115 generates the initial phase command θ0 on the basis of the calculation result of the initial magnetic pole position estimation unit 113. As shown in the following formula (2), the addition calculation unit 116 generates the first phase θs by adding the phase Δθ generated by the integral calculation unit 112 to the initial phase command θ0 generated by the initial phase command generation unit 115. This first phase θs is used for the startup stage of the synchronous motor 2.

$$\theta s = \theta 0 + \Delta\theta \quad (2)$$

As described above, the first phase θs is estimated from the phase of the rotor 21R on the basis of the initial phase of the rotor coordinate system. The first phase estimation unit 11 corrects the first phase by using the detection result (detection phase) of the rotor position detected from the start of the startup procedure of the synchronous motor 2 to the successful startup. The start of the startup procedure of the synchronous motor 2 means, for example, starting to supply an excitation current to the field winding 24.

As shown in FIG. 1A, the drive control unit 13 includes, for example, a speed control unit 132, a current control unit 134, a GP control unit 135, and a switching unit 136.

The speed control unit 132 generates a current command in which an estimated speed ω_fbk matches the speed command ω_ref on the basis of the speed command ω_ref. The current control unit 134 generates a voltage command Euvw_ref in which an estimated current matches the current command on the basis of the current command. The GP control unit 135 generates a gate pulse on the basis of the voltage command Euvw_ref and the phase θ. For example, the GP control unit 135 uses the voltage command Euvw_ref as a coefficient and generates a sine wave of each phase of UVW by using a sine value of the phase θ. The GP control unit 135 generates a gate pulse of each phase by PWM-modulating the sine wave of each phase of the UVW using a triangular carrier signal. Additionally, the generation of the gate pulse of each phase using the GP control unit 135 is not limited to the above method, and a general method can be adopted instead.

The switching unit 136 selects any one of the first phase θs generated by the first phase estimation unit 11 and the second phase θsync generated by the second phase estimation unit 12 on the basis of the determination result of the state determination unit 15 and outputs the selection result as the phase θ.

In this way, the drive control unit 13 controls the driving of the synchronous motor 2 by using any one of the first phase θs and the second phase according to the determination result of the operation state of the synchronous motor 2.

Next, initial magnetic pole position detection at startup stage of the embodiment will be described with reference to FIG. 4.

Figure 4:
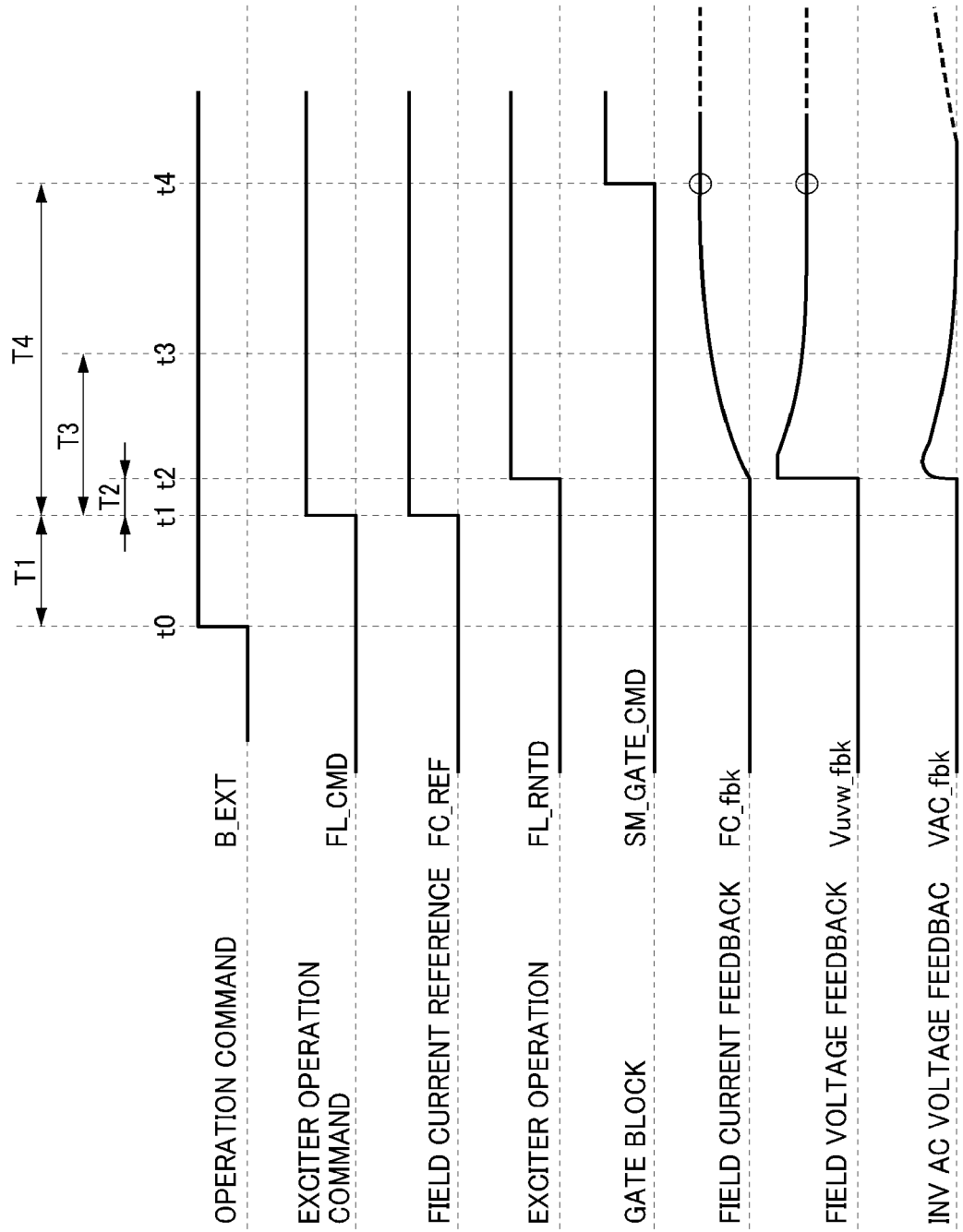
FIG. 4 is a timing chart relating to initial magnetic pole position detection at the startup stage of the embodiment.

FIG. 4 is a timing chart relating to the initial magnetic pole position detection at startup stage of the embodiment.

In FIG. 4, signals of an operation command B_EXT, an exciter operation command FL_CMD, a field current reference FC_ref, an exciter operation FL_RNTD, a gate command GATE_CMD, a field current feedback FC_fbk, a field voltage feedback Vuvw_fbk, and an AC voltage feedback VAC_fbk are arranged in order from the upper side and a change in amplitude of each signal is shown.

The operation command B_EXT is the operation command of the drive system 1 supplied from an upper-level device.

The H level of this signal indicates the operation of the synchronous motor 2, and the L level of this signal indicates the stop thereof. For example, the transition of this signal from L level to H level indicates the start of operation (or startup).

When the H level indicating the start of the operation is supplied by the operation command B_EXT, the sequence control unit 16 generates a signal for starting the synchronous motor 2. The signals of the exciter operation command FL_CMD, the field current reference FC_ref, and the exciter operation FL_RNTD are examples of the signals for starting the synchronous motor 2. The exciter operation command FL_CMD activates the exciter 4 to enable the output of the excitation current. The field current reference FC_ref indicates a reference level that defines the magnitude of the field current. The exciter operation FL_RNTD is a signal for outputting an excitation current from the exciter 4 after the exciter 4 is activated.

The gate command GATE_CMD is a control signal for controlling the supply of the gate pulse with respect to the inverter 3. When this signal becomes H level, a gate pulse is supplied to the inverter 3, and when this signal becomes L level, the supply of the gate pulse to the inverter 3 is stopped. The sequence control unit 16 generates the exciter operation command FL_CMD, the field current reference FC_ref, the exciter operation FL_RNTD, and the gate command GATE_CMD and controls each unit inside the control unit 10 by using these.

The field current feedback FC_fbk is the amplitude of the current indicated by the detection value of the current flowing through the field winding 24 detected by the transformer provided in the wiring connected to the field winding 24. The field voltage feedback Vuvw_fbk is the amplitude of the voltage indicated by the detection value of the voltage across both ends of the field winding 24. The AC voltage feedback VAC_fbk^abs (referred to as VAC_fbk) is a detection value of the three-phase AC voltage.

In the initial stage shown in FIG. 4, the synchronous motor 2 is stopped. The operation command B_EXT, the exciter operation command FL_CMD, the exciter operation FL_RNTD, and the gate command GATE_CMD are at the L level. Any one of the field current reference FC_ref, the field current feedback FC_fbk, the field voltage feedback Vuvw_fbk, and the AC voltage feedback VAC_fbk is at the L level.

At the time to, the operation command B_EXT transitions to H level. The sequence control unit 16 detects this transition and starts the timer T1. The period of the timer T1 may be set in advance.

The timer T1 expires at the time t1. In response to this, the sequence control unit 16 outputs the exciter operation command FL_CMD at the H level, changes the field current reference FC_ref to a desired level in steps, and starts the timers T2 to T4. The period from the timers T2 to T4 may be set in advance. Additionally, the sequence control unit 16 maintains the output levels of other signals.

The timer T2 expires at the time t2. In response to this, the sequence control unit 16 outputs the exciter operation FL_RNTD at the H level. The exciter 4 detects this and starts the output of the voltage and the supply of the field current. The output voltage of the exciter 4 also rises at the same time. In response to this, the amplitudes of the field current feedback FC_fbk and the field voltage feedback Vuvw_fbk change. The voltage integrator 14 integrates the field voltage feedback Vuvw_fbk to generate the AC voltage feedback VAC_fbk.

The timer T3 expires at the time t3. The period of the timer T3 corresponds to the period for calculating the initial position. The coordinate conversion unit 121 calculates the field voltage feedback Vdq_fbk on the basis of the field voltage feedback Vuvw_fbk using the initial value of the second phase θsync. This calculation is, for example, a dq conversion that converts a so-called three-phase signal into a two-phase signal in the rotor coordinate system. The initial magnetic pole position estimation unit 113 uses the elements of the field voltage feedback Vdq_fbk to calculate the initial magnetic pole position θ_fbk according to the above-described formula (1).

The initial phase command generation unit 115 generates the initial position θ_0 based on the initial magnetic pole position θ_fbk obtained by adding the initial magnetic pole position offset θ_mo thereto.

For example, when the timer T4 expires at the time t4, the initial phase command generation unit 115 receives a command from the sequence control unit 16, stores the initial magnetic pole position θ_fbk at that time point, and outputs the initial position θ_0 based on that position.

At this time, the initial phase command generation unit 115 compares the position number of the phase indicated by the initial position θ_0 of the calculation result of the initial magnetic pole position estimation unit 113 with the position number detected by the position detector 22 and adjusts the initial phase command θ0 by a predetermined method when the actual phase (referred to as the actual phase θ_det) detected by the position detector 22 does not follow the initial phase command θ0. This adjustment will be described below. When the startup of the synchronous motor 2 using the initial phase command θ0 succeeds, the sequence control unit 16 sets the gate command GATE_CMD to H level and starts the supply of the AC power from the inverter 3 to the synchronous motor 2 in response to this.

Figures 5, 6:
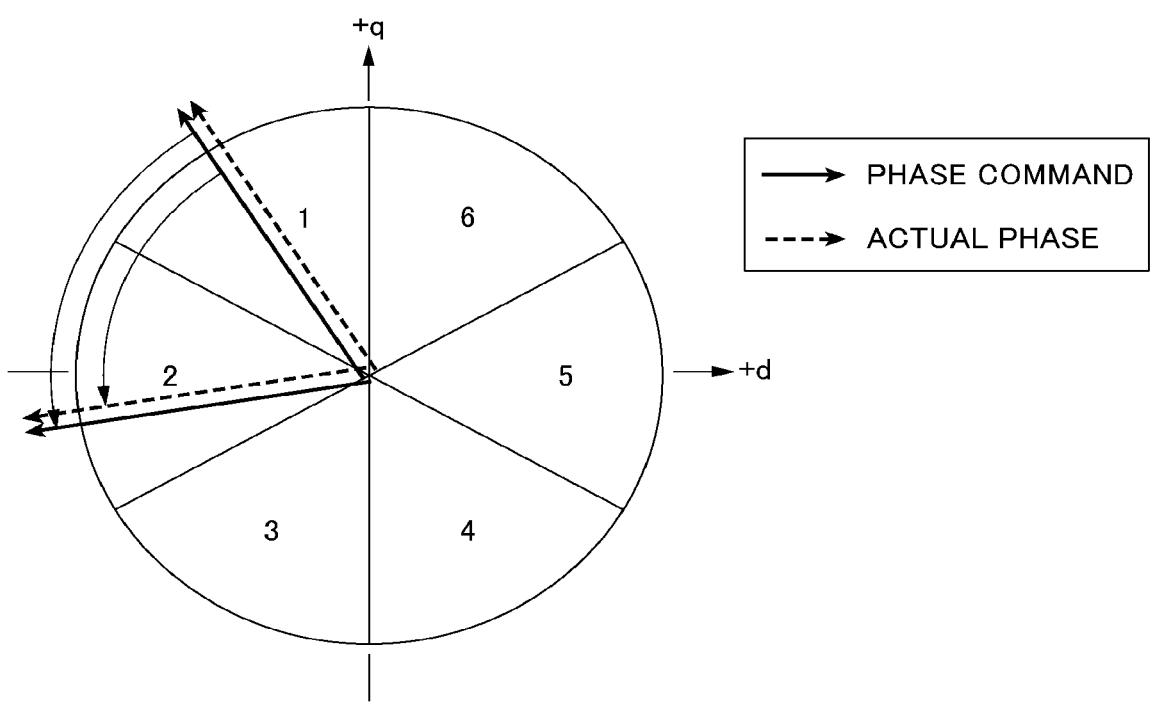
FIG. 5 is a diagram showing a relationship between a position and a position number output from a position detection unit of the embodiment.
FIG. 6 is a diagram showing a case where normal startup is performed in the embodiment.

Referring to FIG. 5, a relationship between the position and the position number output from the position detector 22 of the embodiment will be described. FIG. 5 is a diagram showing a relationship between the position and the position number output from the position detector 22 of the embodiment.

A relationship of six regions (phase regions) identified using identification information PID from P1 to P6, an angle range θP assigned to the regions, identification information PCID of a center position in the region, and an angle θPC of a center position is shown. For example, in a region in which the identification information PID is identified as P1, PC1 is the center position in the region in the identification information PCID. The position of PC1 is θPC1 and the angle range of the region P1 is within ta centered on θPC1. Other regions P2 to P6 centered on PC2 to PC6 are the same as above.

Figure 7:
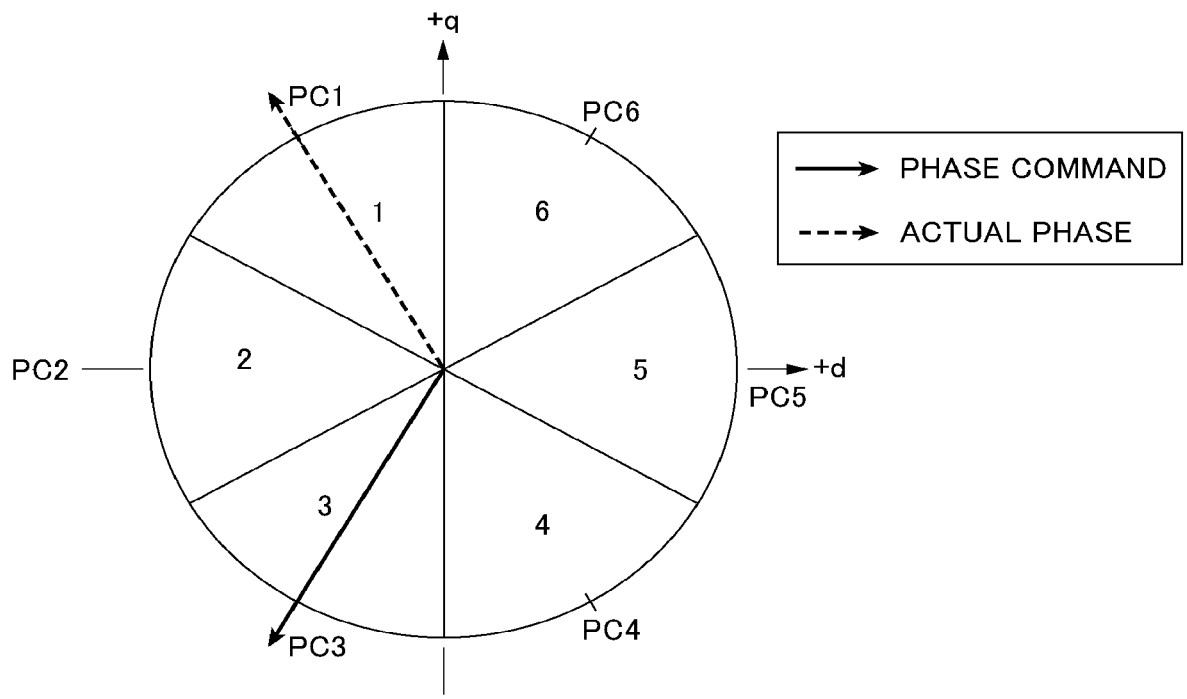
FIG. 7 is a diagram showing a case where normal startup is not performed in the embodiment.
Figure 8:
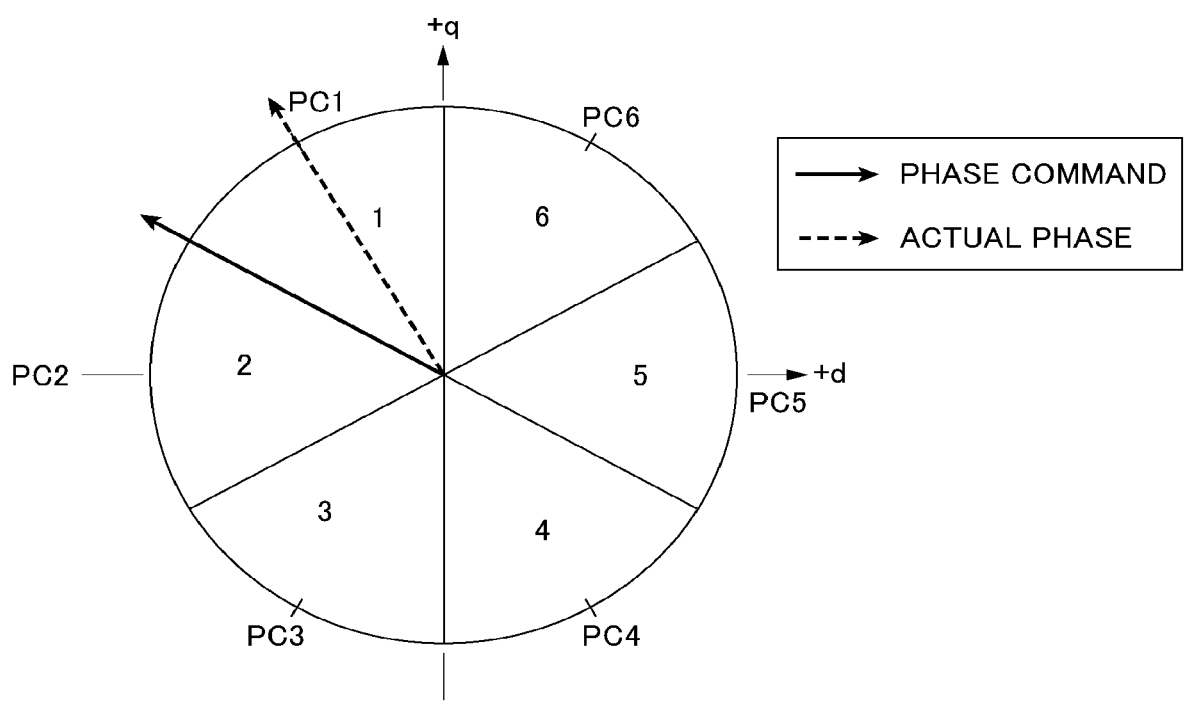
FIG. 8 is a diagram showing a case of correcting a value of an initial phase of a phase command shown in FIG. 7.

Referring to FIGS. 6 to 8, an operation at startup stage of the embodiment will be described.

FIG. 6 is a diagram showing a case of normal startup of the embodiment. An example shown in FIG. 6 shows a case of normal startup. If there is no problem in estimating the initial magnetic pole position and a sufficient current for the required starting torque can be supplied, the motor rotates at a desired speed on the basis of the phase command.

Incidentally, in order to more accurately estimate the initial magnetic pole position, it is preferable that the initial magnetic pole position is correctly detected by the position detector 22 and it is preferable that the mechanical position detected as the initial magnetic pole position used as the phase at the startup of the synchronous motor 2 matches the actual position.

Referring to FIGS. 4, 7, and 8, an example in which a normal startup is not performed in the embodiment and countermeasures thereof will be described. FIG. 7 is a diagram showing a case where a normal startup is not performed in the embodiment. FIG. 8 is a diagram showing a case of correcting the value of the initial phase of the phase command shown in FIG. 7.

For example, the initial magnetic pole position which is the phase of the phase command used for the control at the startup stage of the synchronous motor 2 is determined at the startup stage of the synchronous motor 2.

In the case of a comparative example, the synchronous motor 2 may not start normally depending on the suitability of the initial magnetic pole position based on this phase command. One example is that the mechanical position detected as the initial magnetic pole position used as the phase when the synchronous motor 2 is started does not match the actual position within a predetermined range.

In this embodiment, when the synchronous motor 2 is started according to the procedure shown in FIG. 4, the initial magnetic pole position of the phase command is adjusted at the startup stage of the synchronous motor 2 to increase the possibility of startup. Additionally, in this embodiment, this is carried out in a state in which the field voltage feedback Vdq_fbk can be detected with desired accuracy by the second phase estimation unit 12 including the voltage integrator 14 and the coordinate conversion unit 121 and the initial magnetic pole position can be detected by the position detector 22 with desired accuracy. In the following description, to detect the initial magnetic pole position with desired accuracy means to correctly detect the initial magnetic pole position.

This case will be described below.

The startup stage of the synchronous motor 2 is, for example, a period after the time t4 of FIG. 4 and is a stage in which the gate command transitions to H level. For example, the process of this embodiment may be performed after the sequence control unit 16 has expired the period of the timer T4.

As shown in FIG. 7, the position number according to the phase command and the actual rotor position number (identification information PID) may differ from each other before the synchronous motor 2 is started, and the difference may be relatively large. The state shown in the drawing is an example. For example, the position number according to the phase command is in a region identified as P3, but the actual rotor position number is in a region identified as P1. A more desirable state in the startup stage is that the position number according to the phase command and the actual rotor position number match when the synchronous motor 2 starts. It is preferable that the mismatch between the position number according to the phase command and the actual rotor position number is solved by correcting the phase command. Additionally, the actual rotor position number corresponds to the actual phase detected by the position detector 22. This may be indicated by identification information PID.

For example, as shown in FIG. 8, the initial magnetic pole position indicated by the phase command is corrected to the position corresponding to the actual position number by correcting the initial magnetic pole position indicated by the phase command to the phase of the boundary between the actual position number region "1" and the adjacent position number region "2".

Incidentally, it is preferable to realize both conditions of correctly detecting the initial magnetic pole position by using the position detector 22 and allowing the mechanical position used for control of the phase at the startup of the synchronous motor 2 to match the actual position in order to increase the accuracy of starting the synchronous motor 2. The latter may be interpreted as that at least the position number indicating the mechanical position and the position number indicating the actual position are matched.

However, in the case of a comparative example in which the position detector 22 is simply attached to the synchronous motor 2, an error may occur between the mechanical position and the actual position or the position numbers may differ from each other. In this way, in the case of a comparative example in which the position error is relatively large, even when the position detector 22 can detect the initial magnetic pole position, the mechanical position used for the control of the phase may not match the actual position and the synchronous motor 2 may not start stably.

Here, in this embodiment, a method of further reducing a position error (a phase error of the initial magnetic pole position) occurring between the mechanical position and the actual position under a state in which the detection of the initial magnetic pole position can be correctly performed by using the aforementioned position detector 22 will be described.

Figure 9:
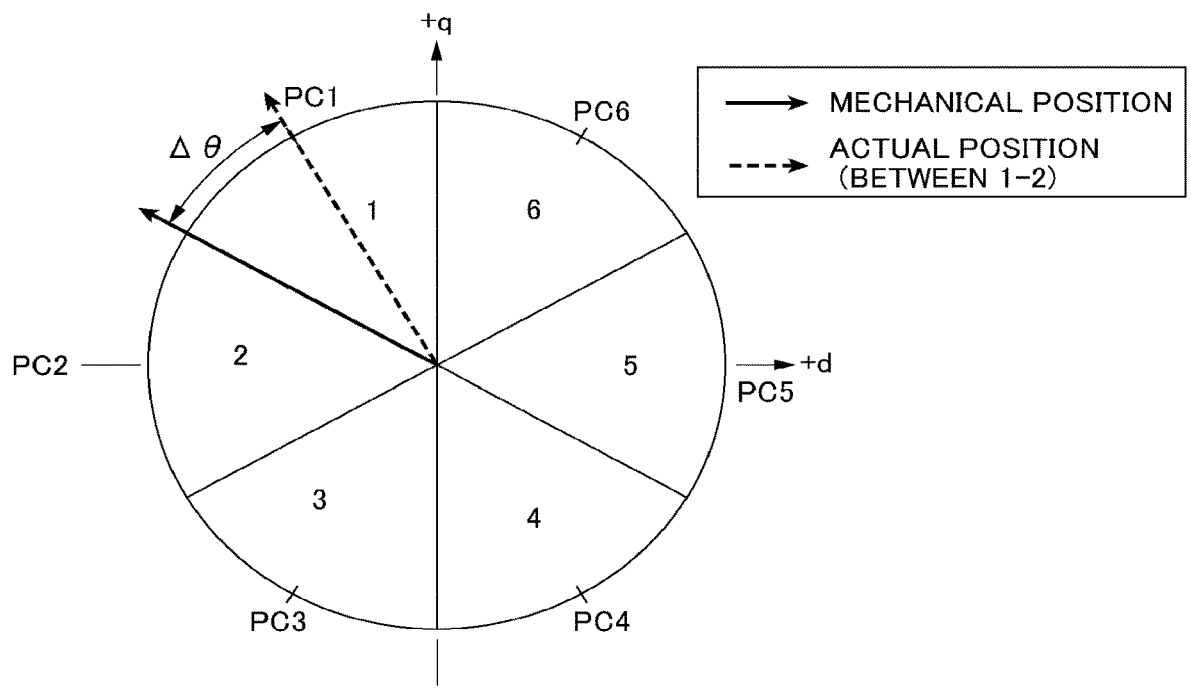
FIG. 9 is a diagram illustrating a correction process for an initial magnetic pole position of the embodiment.

FIG. 9 is a diagram illustrating an initial magnetic pole position correction process of the embodiment.

FIG. 9 is a diagram similar to FIGS. 7 and 8 described above. In FIG. 9, a solid arrow indicates the mechanical position and a dashed arrow indicates an actual position. This case shows a state in which the actual position is detected within the position number region "1", although the actual position should be detected as the phase of the boundary between the actual position number region "1" and the adjacent position number region "2". The phase difference at this time is $\Delta\theta$. A state in which this phase difference is included as a phase error is shown.

Here, in the above case, the initial magnetic pole position indicated by the phase command is corrected to a position corresponding to the actual position number by correcting the initial magnetic pole position indicated by the phase command to the phase of the boundary between the actual position number region "1" and the adjacent position number region "2". By using the position indicated by the phase command after the correction, it is preferable that the synchronous motor 2 is controlled.

Figure 10:
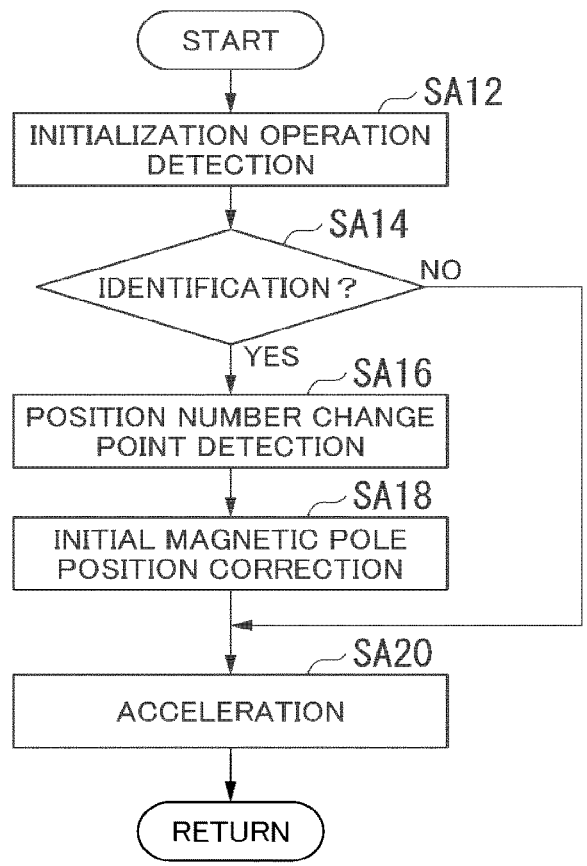
FIG. 10 is a flowchart of the correction process for the initial magnetic pole position of the embodiment.

FIG. 10 is a flowchart of the initial magnetic pole position correction process of the embodiment.

For example, after the synchronous motor 2 is excited so that the gate command transitions to H level for startup by the control of the sequence control unit 16, the initial phase command generation unit 115 holds the initial value of the initial magnetic pole position based on the detection result of the position detector 22 and outputs the initial phase command $\theta 0$ based on the value.

The sequence control unit 16 detects that there has been an operation relating to an initialization request for the initial magnetic pole position (step SA12) and accordingly identifies whether or not the initial magnetic pole position can be detected (step SA14). Additionally, if a predetermined condition is satisfied, step SA12 may be omitted.

When it is identified that the initial magnetic pole position can be detected, the sequence control unit 16 rotates the synchronous motor 2 at a relatively slow speed from the initial magnetic pole position. During the rotation, the offset angle adjustment unit 17 detects a change point of the position number according to the detection result of the position detector 22 (step SA16). Accordingly, the offset angle adjustment unit 17 detects the boundary (edge) of the region defining the phase.

For example, the offset angle adjustment unit 17 sets a phase difference between the phase $\theta s$ when detecting the boundary of the region and the initial value of the initial magnetic pole position (the initial position $\theta\_0$ based on the initial magnetic pole position $\theta\_fbk$) as a phase error of the initial magnetic pole position. This phase difference is equal to the phase $\Delta\theta$. The offset angle adjustment unit 17 adjusts the offset amount $\theta\_mo$ of the initial magnetic pole position so that the phase error becomes small when the phase error (phase $\Delta\theta$) of the initial magnetic pole position exceeds a predetermined value.

The initial magnetic pole position estimation unit 113 estimates the initial magnetic pole position $\theta\_fbk$ again on the basis of the field voltage feedback Vdq_fbk and the offset amount $\theta\_mo$ of the adjusted initial magnetic pole position by using the above formula (1). Accordingly, the initial phase command generation unit 115 adjusts the initial phase command $\theta 0$ again on the basis of the new estimation result obtained by the initial magnetic pole position estimation unit 113. By the above-described process, the first phase estimation unit 11 may correct the initial magnetic pole position (initial magnetic pole phase) (step SA18).

When it is not identified that the detection of the initial magnetic pole position is possible or the process of step SA18 is finished, the sequence control unit 16 gradually accelerates the synchronous motor 2 using the initial magnetic pole position (step SA20) and continues the acceleration until a desired speed is reached.

Accordingly, it is possible to compensate the errors in the above positions in a controlled manner.

According to the above-described embodiment, the position detector 22 of the drive system 1 detects the phase of the rotor 21R of the synchronous motor 2 and outputs the phase information indicating the detected phase. The first phase estimation unit 11 generates an initial phase command of defining the position of the rotor 21R of the synchronous motor 2 by using the correction amount for correcting the phase error. The offset angle adjustment unit 17 generates a correction amount for adjusting the phase error of the initial magnetic pole position. The drive control unit 13 controls the driving of the synchronous motor 2 by using the initial phase command obtained by adjusting the phase error. Accordingly, it is possible to more accurately specify the phase at the startup stage of the synchronous motor 2.

Additionally, the offset angle adjustment unit 17 may generate a correction amount for correcting the phase error by using the phase information and the initial phase command $\theta 0$. The position number is an example of the phase information. For example, the offset angle adjustment unit 17 calculates the adjustment amount (offset amount $\theta\_mo$) for decreasing the phase error larger than a predetermined value. Accordingly, the initial phase command generation unit 115 generates the phase command value by using the adjustment amount and the estimation result.

The error of the initial magnetic pole position with respect to the phase of the rotor 21R may be corrected by using the detection result of the phase of the rotor 21R and the initial phase estimation value. The offset angle adjustment unit 17 may calculate an adjustment amount (offset amount $\theta\_mo$) that decreases the phase error of the initial magnetic pole position when the phase error larger than a predetermined value occurs. The initial phase command generation unit 115 may generate the phase command value $\theta 0$ by using the adjustment amount and the estimation result. The initial phase command generation unit 115 and the offset angle adjustment unit 17 may use the initial magnetic pole position after the correction as the phase at the startup of the synchronous motor 2.

The synchronous motor 2 of the embodiment is the excitation type synchronous motor. In the control method of the embodiment, a plurality of angle regions obtained by dividing the entire electrical angle range of the synchronous motor 2 are determined and used.

The position detector 22 detects the phase of the rotor using the boundary of this angle region as an index. The initial phase command generation unit 115 can adjust the initial magnetic pole position with accuracy in units of the angle region.

Modified Example of Embodiment

A modified example of the embodiment will be described.

The adjustment of the initial phase related to the phase command θ may be performed in such a manner that the initial phase command generation unit 115 adds an offset to the phase θ0. Instead of this, the integral calculation unit 112 may directly change the value of the phase Δθ which is an output value according to the command of the initial phase command generation unit 115.

According to at least one of the above-described embodiments, a drive system includes a rotor phase detection unit, a phase estimation unit, a phase error adjustment unit, and a drive control unit. The drive system includes a rotor phase detection unit, a phase estimation unit, a phase error adjustment unit, and a drive control unit. The rotor phase detection unit detects a phase of a rotor of a synchronous motor and outputs phase information indicating the detected phase. The phase estimation unit generates an initial phase command of defining a position of the rotor of the synchronous motor by using a correction amount for correcting a phase error. The phase error adjustment unit generates the correction amount for adjusting a phase error of an initial magnetic pole position of the synchronous motor by using a phase error of the initial phase command at a timing defined by the phase information. The drive control unit controls the driving of the synchronous motor by using the initial phase command obtained by adjusting the phase error. Accordingly, it is possible to more accurately assign a phase at a startup stage of the synchronous motor.

Although some embodiments of the present invention have been described, these embodiments are presented as examples and are not intended to limit the scope of the invention. These embodiments can be implemented in various other forms, and can be omitted, replaced, and changed in various ways that do not deviate from the invention. These embodiments and their modifications are also included in the invention described in the claims and the equivalent range thereof, as included in the scope of the invention and the essentials.

REFERENCE SIGNS LIST

1 Drive system
2 Synchronous motor
3 Inverter
4 Exciter
10 Control unit
11 First phase estimation unit
12 Second phase estimation unit
13 Drive control unit
14 Voltage integrator (state estimation unit)
15 State determination unit
16 Sequence control unit
17 Offset angle adjustment unit
18 Input-output unit
19 Storage unit
22 Position detector (rotor phase detection unit)

The invention claimed is:

1. A drive system comprising:

a rotor phase detection circuit that is disposed to be able to detect a phase of a rotor of a synchronous motor and outputs phase information indicating the detected phase;

a phase estimation circuit that generates an initial phase command of defining a position of the rotor of the synchronous motor by using a correction amount for correcting a phase error;

a phase error adjustment circuit that generates the correction amount for adjusting a phase error of an initial magnetic pole position of the synchronous motor by using a phase error of an initial phase command at a timing defined by the phase information; and a drive control circuit that controls driving of the synchronous motor by using the initial phase command obtained by adjusting the phase error, wherein the phase estimation circuit includes an initial magnetic pole position estimation circuit that generates a phase command value by using the correction amount and an estimation result of the phase of the rotor, an initial phase command generation circuit that acquires a detection phase corresponding to the phase of the rotor detected by the rotor phase detection circuit, and a calculation processing circuit that generates the phase Δθ corresponding to an integral value of a speed command on the basis of the speed command of the synchronous motor.

2. The drive system according to claim 1, wherein the timing defined by the phase information is a timing at which a phase region indicated by the phase information is switched.

3. The drive system according to claim 1, wherein the phase error adjustment circuit calculates an adjustment amount for decreasing a phase error larger than a predetermined value.

4. A control method comprising the steps of:

outputting phase information indicating a phase detected by a rotor phase detection circuit disposed to be able to detect a phase of a rotor of a synchronous motor;

generating an initial phase command defining a position of the rotor of the synchronous motor by using a correction amount for correcting a phase error;

generating the correction amount for adjusting a phase error of an initial magnetic pole position of the synchronous motor by using a phase error of the initial phase command at a timing defined by the phase information; and controlling driving of the synchronous motor by using the initial phase command obtained by adjusting the phase error, wherein the generating an initial phase command further includes generating a phase command value by using the correction amount and an estimation result of the phase of the rotor, acquiring a detection phase corresponding to the phase of the rotor detected by the rotor phase detection circuit, and generating the phase Δθ corresponding to an integral value of a speed command on the basis of the speed command of the synchronous motor.

* * * * *